(12) United States Patent
Artinger

(10) Patent No.: US 6,873,958 B2
(45) Date of Patent: Mar. 29, 2005

(54) METHOD AND SYSTEM FOR SELECTING ITEMS TO REPLACE INSURED ITEMS

(75) Inventor: Charles Kurt Artinger, Belleville, IL (US)

(73) Assignee: Replacement Services, LLC, Swansea, IL (US)

( * ) Notice: Subject to any disclaimer, the term of this patent is extended or adjusted under 35 U.S.C. 154(b) by 584 days.

(21) Appl. No.: 09/732,591

(22) Filed: Dec. 8, 2000

(65) Prior Publication Data
US 2002/0072944 A1 Jun. 13, 2002

(51) Int. Cl.⁷ ............................................... G06F 17/60
(52) U.S. Cl. ............................................. 705/4; 707/3
(58) Field of Search ................................ 705/1, 4, 7–9, 705/22, 26–29; 707/1–6, 102, 104

(56) References Cited

U.S. PATENT DOCUMENTS

| | | | | |
|---|---|---|---|---|
| 5,890,129 A | * | 3/1999 | Spurgeon ........................ | 705/4 |
| 5,950,169 A | * | 9/1999 | Borghesi et al. ................ | 705/4 |
| 5,983,238 A | * | 11/1999 | Becker et al. ............ | 707/104.1 |
| 6,304,853 B1 | * | 10/2001 | Malnekoff .................... | 705/27 |
| 6,330,551 B1 | * | 12/2001 | Burchetta et al. ............. | 705/80 |
| 6,336,096 B1 | * | 1/2002 | Jernberg ........................ | 705/4 |
| 6,449,611 B1 | * | 9/2002 | Frankel et al. ................. | 707/6 |

FOREIGN PATENT DOCUMENTS

WO    WO 93/12496    *   6/1993    .......... G06F/15/24

OTHER PUBLICATIONS

ReplacementFinder.com uses Internet Speed to Connect the Insurance Industry with Suppliers Who Replace Lost, Damaged, and Stolen Items Quickly, PR Newswire, Jun. 8, 2000.*

* cited by examiner

Primary Examiner—Mary Da Zhi Wang Cheung
(74) Attorney, Agent, or Firm—Armstrong Teasdale LLP (57) ABSTRACT

A web-based method for identifying items to replace insured items includes receiving item specification information from at least one of a user, a manufacturer, a distributor, a system administrator, and an authorizing agent, and utilizing a server to compare the received specification information with pre-stored information. The method also includes selecting at least one item which matches the received specification information and downloading information to the user related to the item.

39 Claims, 8 Drawing Sheets

PLEASE SELECT A CATEGORY
THAT BEST DESCRIBES THE          (R) EPLACEMENT SERVICES    114
ITEM TO BE REPLACED        110                      112   DISPLAY
102                           CUSTOMER SERVICE    CONTACT  SELECTED
                                                          ITEMS

ANNIVERSARY RINGS — 120       REPLACEMENT PROCEDURE
BLANK MOUNTINGS — 122
COLORED STONE BRACELETS — 124   THERE ARE 3 BASIC STEPS TO INSURANCE
COLORED STONE EARRINGS — 126    REPLACEMENTS ON-LINE
COLORED STONE PENDANTS — 127    o STEP 1
COLORED STONE RINGS — 128         SELECT A CATEGORY OF JEWELRY THAT
DIAMOND BANGLE BRACELETS — 130    BEST DESCRIBES THE ITEM TO BE
DIAMOND DINNER RINGS — 132        REPLACED AND ENTER YOUR DESCRIPTION
DIAMOND EAR STUDS — 134           OF THE ITEM IN THE SEARCH ENGINE.
104 { DIAMOND EARRINGS — 136    o STEP 2
DIAMOND PENDANTS — 138            SELECT FROM THE ITEMS DISPLAYED
DIAMOND TENNIS BRACELETS — 140    BY THE SEARCH ENGINE FOR YOUR JEWELRY
ENGAGEMENT RINGS COMPLETE — 142   REPLACEMENT BY CLICKING THE (R).       } 106
ENGAGEMENT RINGS SEMI SET — 144   PLEASE NOTE THAT THE JEWELRY ITEM DOES
GOLD BRACELETS — 146              NOT HAVE TO BE AN EXACT MATCH FOR THE
GOLD CHAINS — 148                 REPLACEMENT. IF YOU FIND A STYLE YOU
GOLD EARRINGS — 149               LIKE BETTER YOU CAN SELECT THAT ITEM
LADIES DIAMOND RINGS — 150        AS LONG AS THE SEARCH CRITERIA IS THE
LOOSE DIAMONDS — 152              SAME AS THE ITEM LOST.
MENS BRACELETS — 154            o STEP 3
MENS COLORED STONE RINGS — 156    FILL OUT THE REGISTRATION FORM
MENS DIAMOND RINGS — 158          COMPLETE WITH YOUR CLAIM NUMBER. IT
MENS WEDDING RINGS — 160          WILL AUTOMATICALLY BE REFERRED TO YOUR
MENS WEDDING RINGS WITH — 162     CLAIMS REPRESENTATIVE, WHO WILL
DIAMONDS                          CONTACT YOU CONCERNING YOUR CHOICE
PINS/BROACHES — 164               FOR REPLACEMENT.
RELIGIOUS JEWELRY — 166         EASY AS 1,2,3.

FIG. 4

PLEASE SELECT A CATEGORY
THAT BEST DESCRIBES THE
ITEM TO BE REPLACED

180

ANNIVERSARY RINGS

METAL — 188
[ ▽ ]

STONE SHAPE
[ ▽ ]

SECONDARY STONE TYPE — 188
[ ▽ ]

DIAMOND TOTAL WEIGHT
[ ▽ ]

186 { DIAMOND COLOR — 188
[ ▽ ]

DIAMOND CLARITY — 188
[ ▽ ]

[ SUBMIT ]   [ RESET ]
200             203
SELECT NEW CATEGORY

[ BLANK MOUNTINGS  ▽ ]
         [ SUBMIT ]
              — 104
              — 204

185

(R)EPLACEMENT SERVICES

CUSTOMER SERVICE   CONTACT   DISPLAY SELECTED ITEMS

REPLACEMENT PROCEDURE
THERE ARE 3 BASIC STEPS TO INSURANCE REPLACEMENTS ON-LINE o STEP 1
SELECT A CATEGORY OF JEWELRY THAT BEST DESCRIBES THE ITEM TO BE REPLACED AND ENTER YOUR DESCRIPTION OF THE ITEM IN THE SEARCH ENGINE.

o STEP 2
SELECT FROM THE ITEMS DISPLAYED BY THE SEARCH ENGINE FOR YOUR JEWELRY REPLACEMENT BY CLICKING THE (R).

PLEASE NOTE THAT THE JEWELRY ITEM DOES NOT HAVE TO BE AN EXACT MATCH FOR THE REPLACEMENT. IF YOU FIND A STYLE YOU LIKE BETTER YOU CAN SELECT THAT ITEM AS LONG AS THE SEARCH CRITERIA IS THE SAME AS THE ITEM LOST.

o STEP 3
FILL OUT THE REGISTRATION FORM COMPLETE WITH YOUR CLAIM NUMBER. IT WILL AUTOMATICALLY BE REFERRED TO YOUR CLAIMS REPRESENTATIVE, WHO WILL CONTACT YOU CONCERNING YOUR CHOICE FOR REPLACEMENT.

EASY AS 1,2,3.

FIG. 5

PLEASE SELECT A CATEGORY THAT BEST DESCRIBES THE ITEM TO BE REPLACED

182

COLORED STONE EARRINGS

METAL — 188
[dropdown]

STONE TYPE
[dropdown]

STONE SHAPE — 188
[dropdown]

SECONDARY STONE TYPE — 188
[dropdown]

GEM TOTAL WEIGHT
[dropdown]

DIAMOND TOTAL WEIGHT — 188
[dropdown]

[SUBMIT] 200    [RESET] 203

SELECT NEW CATEGORY
ANNIVERSARY RINGS [▽]

[SUBMIT] — 104
— 204

186

185

(R) EPLACEMENT SERVICES

CUSTOMER SERVICE    CONTACT    DISPLAY SELECTED ITEMS

REPLACEMENT PROCEDURE
THERE ARE 3 BASIC STEPS TO INSURANCE REPLACEMENTS ON-LINE o STEP 1
SELECT A CATEGORY OF JEWELRY THAT BEST DESCRIBES THE ITEM TO BE REPLACED AND ENTER YOUR DESCRIPTION OF THE ITEM IN THE SEARCH ENGINE.

o STEP 2
SELECT FROM THE ITEMS DISPLAYED BY THE SEARCH ENGINE FOR YOUR JEWELRY REPLACEMENT BY CLICKING THE (R).
PLEASE NOTE THAT THE JEWELRY ITEM DOES NOT HAVE TO BE AN EXACT MATCH FOR THE REPLACEMENT. IF YOU FIND A STYLE YOU LIKE BETTER YOU CAN SELECT THAT ITEM AS LONG AS THE SEARCH CRITERIA IS THE SAME AS THE ITEM LOST.

o STEP 3
FILL OUT THE REGISTRATION FORM COMPLETE WITH YOUR CLAIM NUMBER. IT WILL AUTOMATICALLY BE REFERRED TO YOUR CLAIMS REPRESENTATIVE, WHO WILL CONTACT YOU CONCERNING YOUR CHOICE FOR REPLACEMENT.

EASY AS 1.2.3.

FIG. 6

PLEASE SELECT A CATEGORY
THAT BEST DESCRIBES THE
ITEM TO BE REPLACED

184

GOLD BRACELETS

METAL — 188

[ ▽ ]

186

STONE TYPE

[ ▽ ]
— 188

[ SUBMIT ]   [ RESET ]
200           203

SELECT NEW CATEGORY

[ ANNIVERSARY RINGS ▽ ]

[ SUBMIT ]
— 104
— 204

185

(R) EPLACEMENT SERVICES

CUSTOMER SERVICE   CONTACT   DISPLAY SELECTED ITEMS

REPLACEMENT PROCEDURE
THERE ARE 3 BASIC STEPS TO INSURANCE
REPLACEMENTS ON-LINE o STEP 1
  SELECT A CATEGORY OF JEWELRY THAT
  BEST DESCRIBES THE ITEM TO BE
  REPLACED AND ENTER YOUR DESCRIPTION
  OF THE ITEM IN THE SEARCH ENGINE.

o STEP 2
  SELECT FROM THE ITEMS DISPLAYED
  BY THE SEARCH ENGINE FOR YOUR JEWELRY
  REPLACEMENT BY CLICKING THE (R).

PLEASE NOTE THAT THE JEWELRY ITEM DOES
  NOT HAVE TO BE AN EXACT MATCH FOR THE
  REPLACEMENT. IF YOU FIND A STYLE YOU
  LIKE BETTER YOU CAN SELECT THAT ITEM
  AS LONG AS THE SEARCH CRITERIA IS THE
  SAME AS THE ITEM LOST.

o STEP 3
  FILL OUT THE REGISTRATION FORM
  COMPLETE WITH YOUR CLAIM NUMBER. IT
  WILL AUTOMATICALLY BE REFERRED TO YOUR
  CLAIMS REPRESENTATIVE, WHO WILL
  CONTACT YOU CONCERNING YOUR CHOICE
  FOR REPLACEMENT.

EASY AS 1.2.3.

FIG. 7

PLEASE SELECT A CATEGORY THAT BEST DESCRIBES THE ITEM TO BE REPLACED (R) EPLACEMENT SERVICES 212

CUSTOMER SERVICE 206 / 208 CONTACT \ 210 DISPLAY SELECTED ITEMS

ANNIVERSARY RINGS
METAL
[ 14K YELLOW GOLD ▽ ]
STONE SHAPE
[ MARQUISE ▽ ]
SECONDARY STONE TYPE
[ BLUE TOPAZ ▽ ]
DIAMOND TOTAL WEIGHT
[ 1.00 ▽ ]
DIAMOND COLOR
[ G-H ▽ ]
DIAMOND CLARITY
[ VVS1 ▽ ]
[ SUBMIT ]  [ RESET ]

SELECT NEW CATEGORY
[ BLANK MOUNTINGS ▽ ]
[ SUBMIT ]

185 — 202 — 220 —

| IMAGE | DESCRIPTION | PRICE | REPLACE |
|---|---|---|---|
| THE FOLLOWING ARE NOT EXACT MATCHES ||||
| ⊙ | RING, PC 0.45 CT. BAG 0.48 CT. | 1404 | (R) |
| ⊙ | RING, PC 0.94 CT. | 2098 | (R) |
| ⊙ | MARQUISE DIAMOND RING, DL | 1460 | (R) |
| ⊙ | UNIVERSAL 14K GOLD ANNIVERSARY RING BAGUETTES 1.45 | 2344 | (R) |
| ⊙ | LADIES 14K YELLOW GOLD ANNIVERSARY BAGUETTES 1.45C | 2060 | (R) |
| ⊙ | LADIES 14K TWO TONE SEMI SET BAGUETTE 1.00CTS CHAN | 1578 | (R) |
| ⊙ | LADIES-PLATINUM RING-22 DIAMONDS-INVISABLE SET-.80CTS | 1972 | (R) |
| ⊙ | RING, BAG 1.04 CT. | 1236 | (R) |
| ⊙ | RING, PC 0.95CT. | 1906 | (R) |

FIG. 8

METHOD AND SYSTEM FOR SELECTING ITEMS TO REPLACE INSURED ITEMS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to computer network-based systems and more particularly to a network-based method and system for selecting items to replace insured items.

Items of value are typically insured with insurance companies to offset the cost of replacing the item if an event occurs such that the item needs replacing. For example, jewelry is often insured to enable an owner to offset the cost of replacing the jewelry in the event the jewelry is lost, damaged, or stolen. Typically, after such an event occurs, the owner contacts the insurance company and files a claim to have the jewelry replaced. To file the claim, the owner typically files proof of ownership of the jewelry, often using a receipt that shows a purchase date and an amount of purchase of the jewelry.

The claim is evaluated by a claims adjuster to determine a value of the originally-insured jewelry in comparison to the value of the insured property and either the owner, the insurance company, or both attempt to find a suitable replacement. The claims adjuster also compares the proposed suitable replacement costs and repair costs, if applicable, to the value of the insured item. Often the process may be cumbersome or time-consuming, and may require many interactions between the insurance company and the owner. Eventually either the owner is issued a check to purchase the replacement item, or the insurance company issues a check directly to a merchant offering the replacement item for sale.

BRIEF SUMMARY OF THE INVENTION

In an exemplary embodiment, a network-based method, implemented on a network-based system, for selecting an item to replace an insured item includes receiving product specification information and comparing the received product specification information with pre-stored item information. If at least one pre-stored item matches the received product specification information, the pre-stored item information is downloaded for communication to the user.

In the exemplary embodiment, the item being replaced is jewelry and the product information may include, for example, features of the product and accessories of the product. The system validates replacement compatibility based on product information data and features of the product to determine whether a resulting product is a suitable replacement, in comparison to a set of given product parameters input. In addition, the system provides a photograph of any jewelry that qualifies as a suitable replacement.

BRIEF DESCRIPTION OF THE DRAWINGS

FIG. 4 is an exemplary jewelry category selector page used with the method shown in FIG. 2;

DETAILED DESCRIPTION OF THE INVENTION

Figure 1:
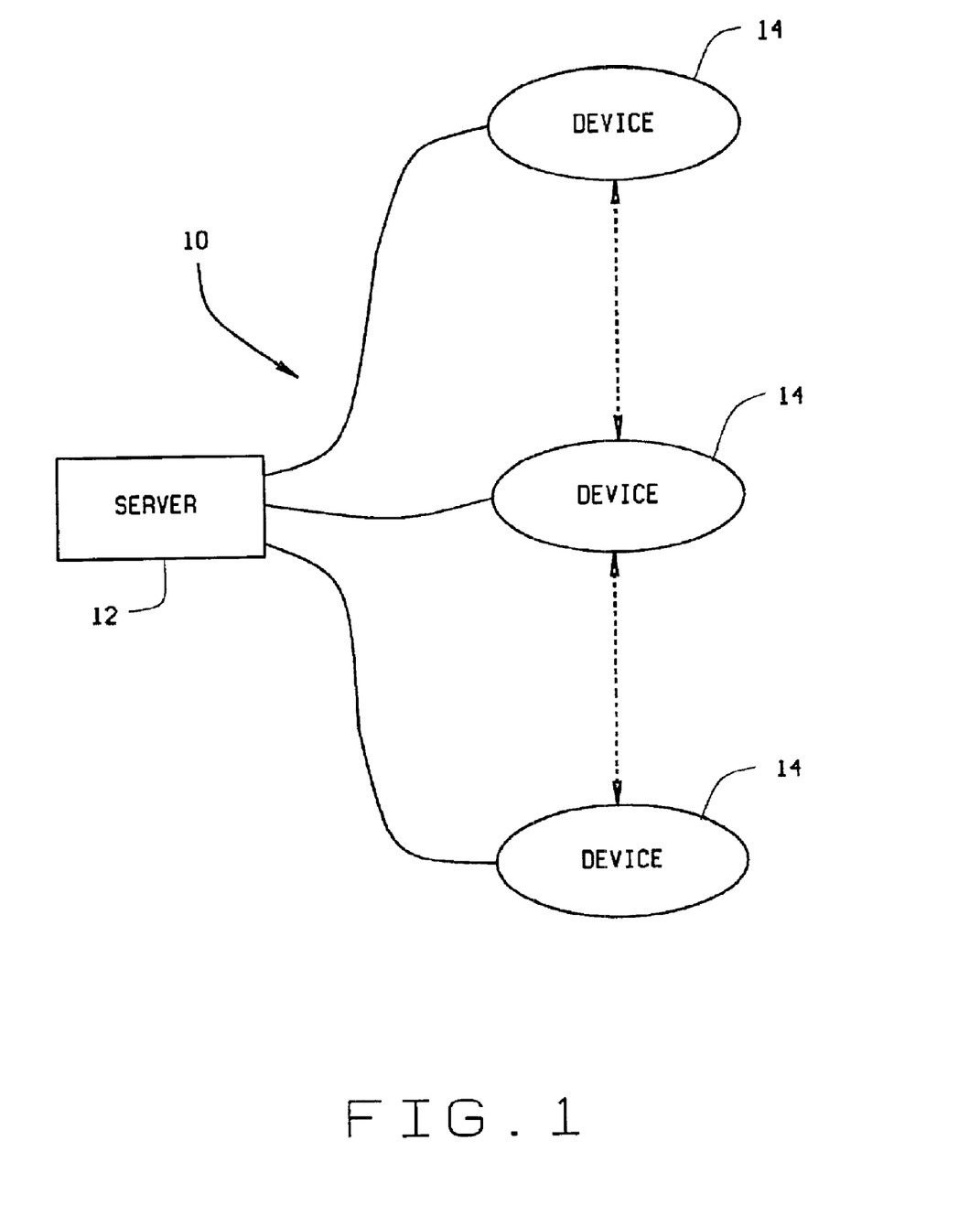
FIG. 1 is a system block diagram.

FIG. 1 is a block diagram of a system 10 in accordance with one embodiment of the present invention. System 10 includes a server 12 and a plurality of devices 14 connected to server 12. In one embodiment, devices 14 are computers including a web browser, and server 12 is accessible to devices 14 via the Internet. In an alternative embodiment, devices 14 are servers for a network of customer devices.

Devices 14 are interconnected to the Internet through many interfaces including through a network, such as a local area network (LAN) or a wide area network (WAN), through dial-in-connections, cable modems and special high-speed ISDN lines. Alternatively, devices 14 could be any device capable of interconnecting to the Internet including a web-based phone or other web-based connectable equipment. A database providing item information is stored on server 12 and can be accessed by potential customers at one of devices 14 by logging onto server 12 through one of devices 14.

Figure 2:
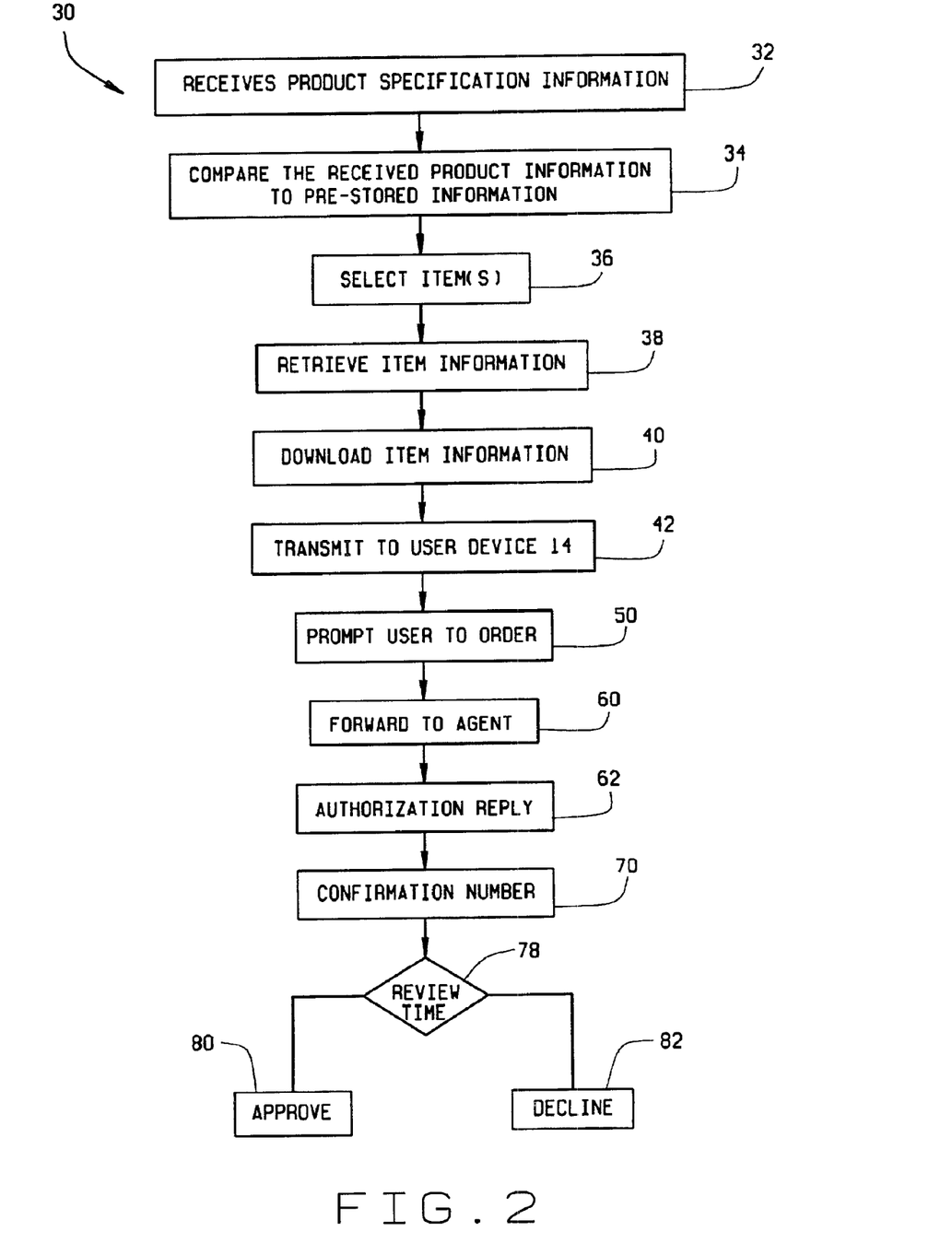
FIG. 2 is a flow diagram of a web-based method for selecting and ordering replacement insured items.

FIG. 2 is a flow diagram 30 for a web-based method for selecting and ordering items (not shown) to replace insured items. In an exemplary embodiment, the items include, but are not limited to, jewelry. Alternatively, the items include any item eligible for insurance coverage and potentially replaceable when insurance claims are filed, such as, but not limited to, home furnishings and automobiles.

System 10 (shown in FIG. 1) receives 32 product specification information from a user. In one embodiment, the user inputs the information into a device (such as device 14 shown in FIG. 1) which transmits the information to a server (such as server 12 shown in FIG. 1). The product specification information is received from the user via a multi-query interface (not shown in FIG. 2) as will be described in greater detail below.

The product specification information received 32 includes an identification of item features and an identification of accessories for the product. In the exemplary embodiment, item features include, but are not limited to, jewelry metal information, gem stone shape, gem stone weight, gem stone color, and gem stone clarity. Additional features include, but are not limited to, secondary gem stone types, secondary gem stone colors, secondary gem stone weight, and secondary gem stone clarity.

Server 12 compares 34 the received information to pre-stored information accessible by server 12. In one embodiment, the pre-stored information is stored in a database that resides on server 12. In an alternative embodiment, the pre-stored information is stored in a database remote from server 12. The pre-stored information includes the item features and accessories information. Server 12 compares the received information to the pre-stored information to determine if any items contained in the pre-stored information satisfy the product specifications submitted.

In addition, system 12 assesses the information received to validate suitability of the product. System 10 evaluates the received information and determines whether a resulting product having the received product specifications is capable of meeting parameters of the indicated product defined by the user. For example, system 10 determines whether accessories are available for the selected item configuration.

If the product resulting from the received information does not meet the parameters of the intended product, system 10 guides the user by providing suggestions for a correct item configuration. In an alternative embodiment, system 10 guides a user by providing information regarding alternative products that may be compatible with the item parameters supplied by the user. In a further alternative embodiment, system 10 guides a user by providing information regarding products that are potential upgrades for the item parameters supplied by the user.

System 10 then identifies pre-stored item information that matches the information entered by the user and selects 36 those items pertaining to that pre-stored information. Item information pertaining to the selected items is then retrieved 38 by system 10. In one embodiment, the item information retrieved 38 includes an item identifier description and an associated price for each selected item. For example, the item identifier description is a jewelers' description suitable for insurance quotes, and the price is a retail price of the product.

Server 12 then transmits the retrieved items identifier number and associated prices and downloads 40 the retrieved information to user device 14, such that the user can view the information and potential alternative selections. In an alternative embodiment, system 10 utilizes the list price information to generate a quotation for each selected item including the indicated features and accessories and server 12 then transmits 42 the retrieved item identifier descriptions and the quotation to user device 14.

System 10 then prompts 50 the user to order one or more of the selected products. If the user is a registered user, system 10 accepts orders online by providing the user a purchase order form and receiving the completed purchase order form from the user. The completed purchase order form is then authenticated against pre-determined criteria to determine whether system 10 should accept the completed purchase order form.

If the purchase order form is accepted, the order is then forwarded 60 to an authorizing agent representing an insurance company. In one embodiment, system 10 is interconnected with a plurality of authoring agents representing a plurality of insurance companies. In the exemplary embodiment, the purchase order is initially e-mailed and/or faxed automatically to the authorizing agent.

After the authorizing agent has reviewed the purchase order to ensure that the item selected is suitably compatible, the authorizing agent submits 62 an authorization reply to system 10, and system 10 automatically prints a hard-copy of the purchase order and e-mails and/or faxes at least one of a manufacturer and a distributor a copy of the purchase order including shipping instructions.

The manufacturer or the distributor receiving the purchase order fills the purchase order and inputs 70 a confirmation number and a shipping tracking number into system 10. In one embodiment, system 10 is compatible with shipment tracking software in use with, but not limited to, Federal Express Company, United Parcel Service, Airborne Express, and the United States Postal Service.

After the user has received the replacement item, system 10 includes an integrated time accounting system that affords the user a period of time 78 to inspect the replacement item. If the user is satisfied with the replacement item, the user then accesses system 10 and approves 80 the sale. If a pre-determined amount of time elapses without a response from the user, system 10 automatically bills the insurance provider. If the user is dissatisfied, the user then accesses system 10 to decline 82 the sale and a shipper is notified to return the item.

If the user is an unregistered user, and the user attempts to order a selected product, system 10 transmits a notification to the user indicating that a sales person or an authorized distributor will contact the user to confirm the order request. System 10 then transmits a notification, such as via email, to a selected person. The selected person then checks the order then follows-up with the user that submitted the order.

Figure 3:
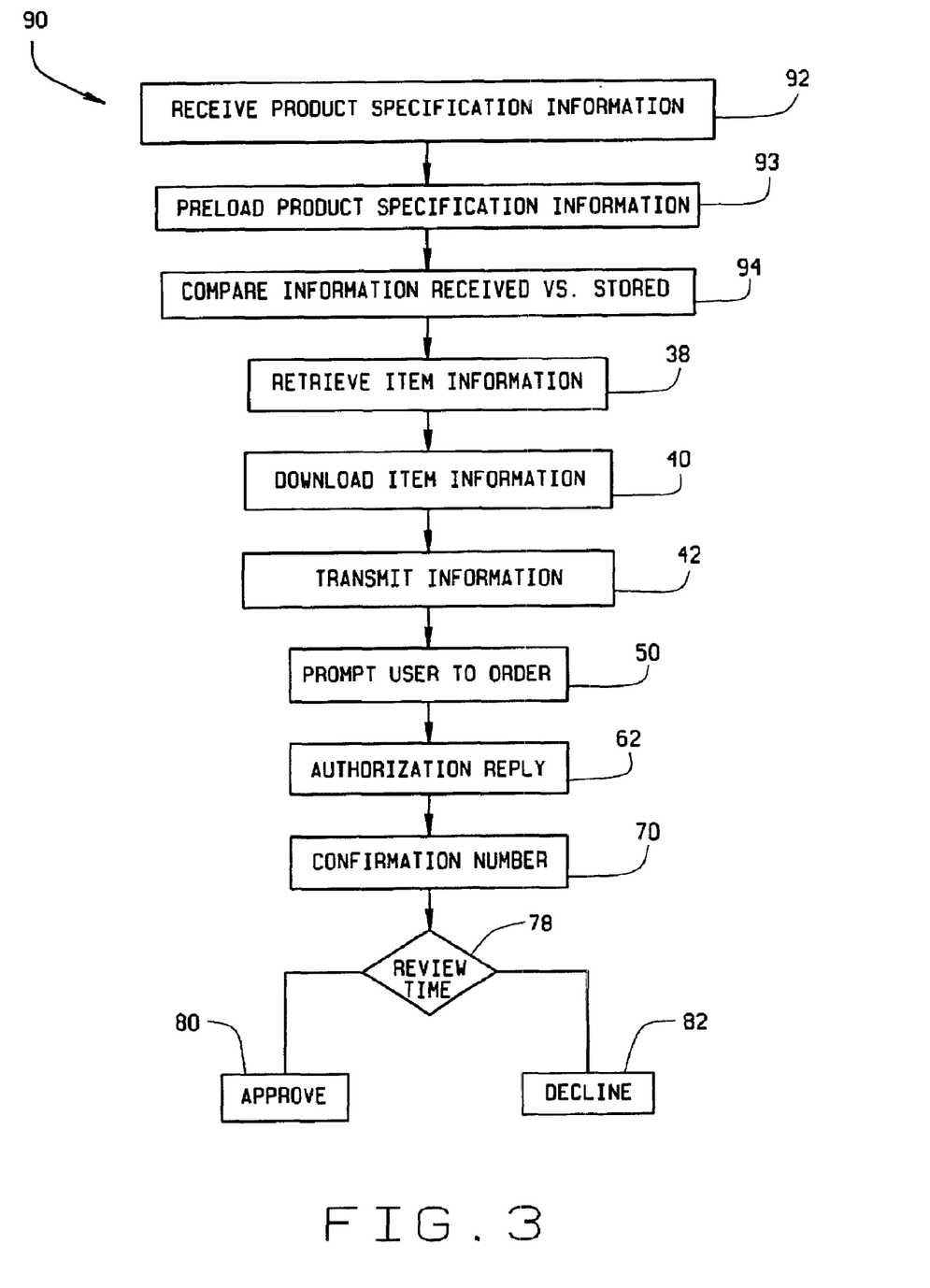
FIG. 3 is a flow diagram of an alternative embodiment of a web-based method for selecting and ordering replacement insured items.

FIG. 3 is a flow diagram 90 for an alternative embodiment of a web-based method for selecting and ordering items (not shown) to replace insured items. Flow diagram 90 is substantially similar to flow diagram 30 (shown in FIG. 2) and items in flow diagram 90 that are the same as items shown in FIG. 2 are indicated in FIG. 3 using the same reference numerals as used in FIG. 2. In the alternative embodiment, the items include, but are not limited to, jewelry. Alternatively, the items include any items eligible for insurance coverage and potentially replaceable when insurance claims are filed, such as, but not limited to, home furnishings and automobiles.

System 10 (shown in FIG. 1) receives 92 product specification information from at least one of an authorizing agent, a manufacturer, and a distributor. More specifically, after receiving a claim notification from a user, an authorizing agent either inputs or preloads the product specification information into a device (such as device 14 shown in FIG. 1) which transmits the information to a server (such as server 12 shown in FIG. 1), or transmits the product specification information to a manufacturer, such that the information is then preloaded 93 into system 10. In one embodiment, at least one of a system administrator, the manufacturer, the authorizing agent, and a distributor preloads 93 the information regarding the item claim into system 10 using a multi-query interface (not shown in FIG. 3).

The product specification information received 92 includes a claim number assigned to the user, an identification of item features, and an identification of accessories for the product. In one embodiment, item features include, but are not limited to, jewelry metal information, gem stone shape, gem stone weight, gem stone color, and gem stone clarity. Additional features include, but are not limited to, secondary gem stone types, secondary gem stone colors, secondary gem stone weight, and secondary gem stone clarity.

Server 12 compares 94 the product information received 92 to pre-stored information accessible by server 12. In one embodiment, the pre-stored information is stored in a database that resides on server 12. In an alternative embodiment, the pre-stored information is stored in a database remote from server 12. The pre-stored information includes the item features and accessories information. Server 12 compares the received information to the pre-stored information to determine if any items contained in the pre-stored information satisfy the product specifications submitted by the user.

In addition, system 12 assesses the information received to validate suitability of the product. System 10 evaluates the received information and determines whether a resulting product having the received product specifications is capable of meeting parameters of the indicated product defined by the authorized agent. For example, system 10 determines whether accessories are available for the selected item configuration.

System 10 then identifies pre-stored item information that matches the information entered by the authorized agent, manufacturer, or distributor, and selects 36 those items pertaining to that pre-stored information. Item information pertaining to the selected items is then retrieved 38 by system 10. In one embodiment, the item information retrieved 38 includes an item identifier description and an associated price for each selected item. For example, the item identifier description is a jewelers' description suitable for insurance quotes, and the price is a retail price of the product.

Server 12 then transmits the retrieved items identifier number and associated prices and downloads 40 the retrieved information to a device 14 so that the authorized agent can view and approve the information and potential alternative selections. In an alternative embodiment, system 10 utilizes the list price information to generate a quotation for each selected item including the indicated features and accessories and server 12 then transmits 42 the retrieved item identifier descriptions and the quotation to a device 14 accessible by the authorized agent.

The selected items approved by the authorized agent and retrieved based on preloaded 93 information are retrievable by a user entering a claim number corresponding to those items. More specifically, a user inputs their claim number into a device which transmits the claim number to the server. System 10 then displays items capable of meeting parameters of the indicated product utilizing the preloaded search criteria approved by the authorized agent. Because the information regarding the item was preloaded 93, product selection and database searching by the user is facilitated to be more efficient, reliable, and quicker than product selection and database searches performed based on information received 32 (shown in FIG. 2) from the user.

System 10 then prompts 50 the user to order one or more of the selected products. System 10 accepts orders online by providing the user a purchase order form and receiving the completed purchase order form from the user. The completed purchase order form is then authenticated against pre-determined criteria to determine whether system 10 should accept the completed purchase order form.

If the purchase order form is accepted, the order is then forwarded 60 to the authorizing agent that approved supplied the search criteria. After the authorizing agent has reviewed the purchase order, the authorizing agent submits 62 an authorization reply to system 10, and system 10 automatically prints a hard-copy of the purchase order and e-mails and/or faxes at least one of a manufacturer and a distributor a copy of the purchase order including shipping instructions.

The manufacturer or the distributor receiving the purchase order fills the purchase order and inputs 70 a confirmation number and a shipping tracking number into system 10. In one embodiment, system 10 is compatible with shipment tracking software in use with, but not limited to, Federal Express Company, United Parcel Service, Airborne Express, and the United States Postal Service.

After the user has received the replacement item, system 10 includes an integrated time accounting system that affords the user a period of time 78 to inspect the replacement item. If the user is satisfied with the replacement item, the user then accesses system 10 and approves 80 the sale. If a pre-determined amount of time elapses without a response from the user, system 10 automatically bills the insurance provider. If the user is dissatisfied, the user then accesses system 10 to decline 82 the sale and a shipper is notified to return the item.

If the user is an unregistered user, and the user attempts to order a selected product, system 10 transmits a notification to the user indicating that a sales person or an authorized distributor will contact the user to confirm the order request. System 10 then transmits a notification, such as via email, to a selected person. The selected person then checks the order then follows-up with the user that submitted the order.

FIGS. 4 through 8 detail navigation through an exemplary web-site linked to system 10 (shown in FIG. 1) via device 14 (shown in FIG. 1) and server 12 (shown in FIG. 1) when flow chart 30 (shown in FIG. 2) is executed. More specifically, FIG. 4 is an exemplary jewelry replacement home page 100 downloaded and displayed on device 14 by server 12 when a user decides to order, or obtain additional information, about available replacement items or jewelry.

Jewelry replacement home page 100 includes a listing 102 of a plurality of jewelry categories 104 and an explanation of replacement procedures 106 for replacing insured items. Page 100 also includes a customer service button 110, a contact button 112, and a display selected items button 114. Prior to entering page 100, a login selection screen (not shown) is displayed to be utilized by repeat users and a new account registration button (not shown) is displayed to be used by first time users.

Jewelry categories 104 provide hyperlinks that permit users to input data specific to the item being replaced. More specifically, in the exemplary embodiment, jewelry categories 104 include anniversary rings 120, blank mountings 122, colored stone bracelets 124, colored stone earrings 126, colored stone pendants 127, colored stone rings 128, diamond bangle bracelets 130, diamond dinner rings 132, diamond ear studs 134, diamond earrings 136, diamond pendants 138, and diamond tennis bracelets 140. Other jewelry categories 104 include engagement rings complete 142, engagement rings semi set 144, gold bracelets 146, gold chains 148, gold earrings 149, ladies diamond rings 150, loose diamonds 152, and men's bracelets 154. Additional jewelry categories 104 include men's colored stone rings 156, men's diamond rings 158, men's wedding rings 160, men's wedding rings with diamonds 162, pins/broaches 164, and religious jewelry 166. Each category 104 provides access to a search page (not shown in FIG. 4) unique to a specific jewelry category 104 selected.

Figure 5:
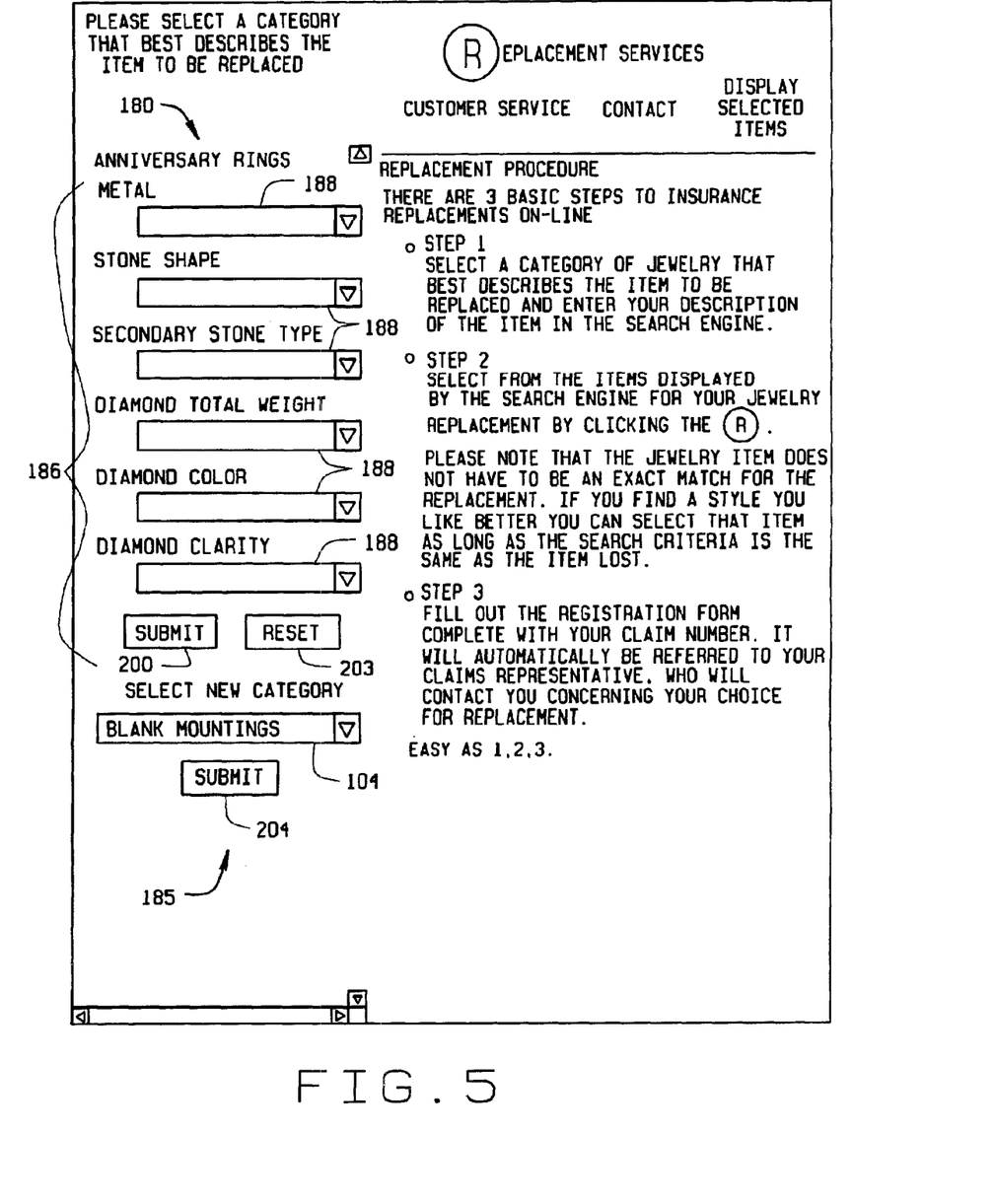
FIG. 5 is an exemplary anniversary rings product information search page used with the method shown in FIG. 2.
Figure 6:
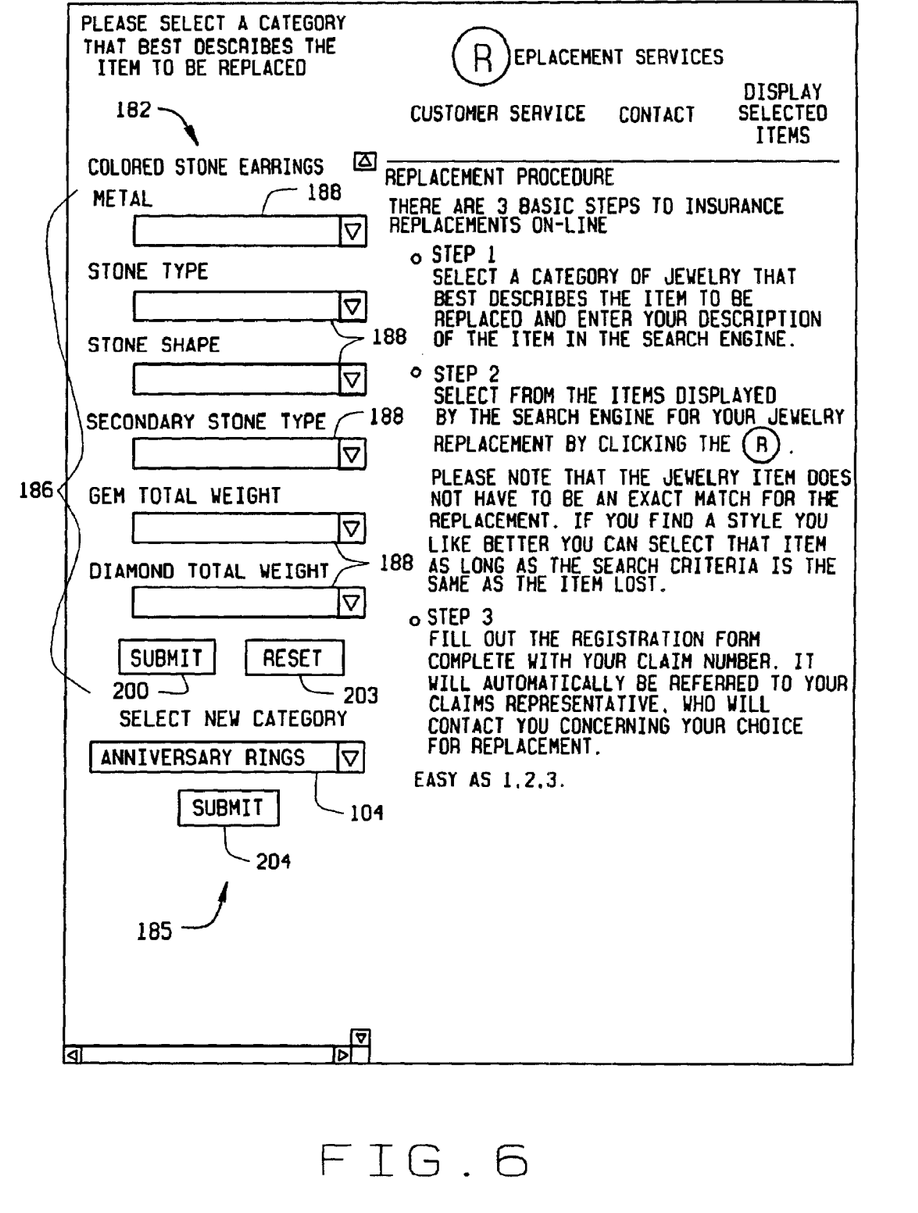
FIG. 6 is an exemplary gold bracelets product information search page used with the method shown in FIG. 2.
Figure 7:
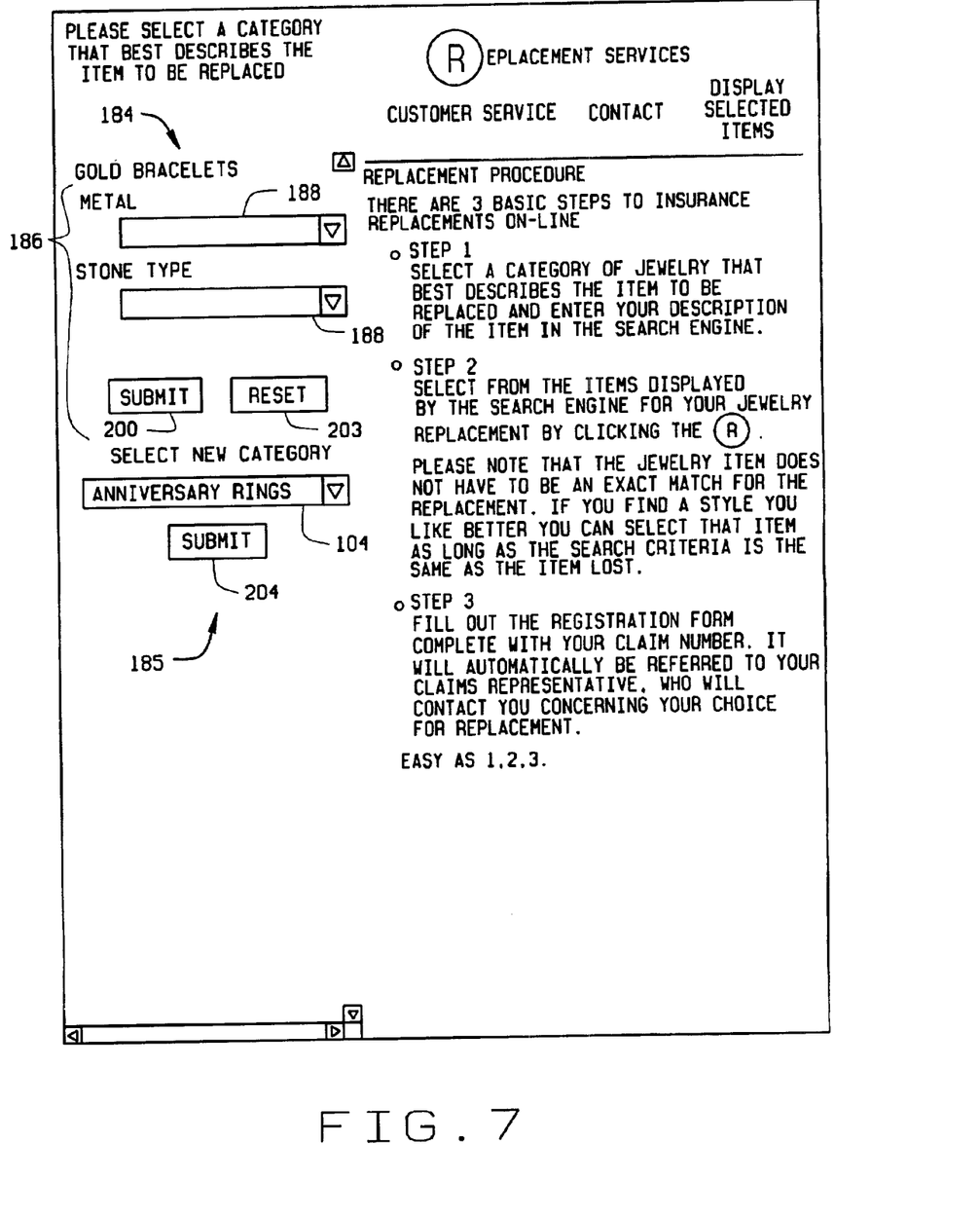
FIG. 7 is an exemplary colored stone earrings product information search page used with the method shown in FIG. 2.

FIG. 5 is an exemplary anniversary rings product information search page 180, FIG. 6 is an exemplary gold bracelets product information search page 182, and FIG. 7 is an exemplary colored stone earrings product information search page 184. If the user selects any of the plurality of jewelry categories 104 (shown in FIG. 4) from listing 102 (shown in FIG. 4), a hyperlink takes the user to an applicable search page 185 unique to each specific jewelry category 104 selected. For example, selecting anniversary rings 120 (shown in FIG. 4) from listing 102 takes users to search page 180, selecting gold bracelets 146 (shown in FIG. 4) takes users to search page 182, and selecting colored stone earrings 126 (shown in FIG. 4) takes users to search page 184. Each search page 185 permits users to input search criteria unique to the item being replaced.

Search pages 185 provide access to a database (not shown) through a multi-query interface 186. Each page multi-query interface 186 includes a plurality of pull down menus 188 that enable the user to select database search criteria that is pertinent to the item being replaced. Each jewelry category 104 selected provides access to the database through a plurality of search criteria categories included within multi-query interface 186.

In the exemplary embodiment, multi-query interface categories include metal, stone type, stone shape, stone weight, secondary stone type, diamond total weight, diamond color, diamond clarity, and gem total weight categories. Each category pull-down menu 188 includes information specific to the category displayed. For example, the metal category includes yellow and white golds of various purity levels, platinum, two-tone, and silver. Furthermore, the stone type category includes baguette, emerald, heart, marquise, oval, pear, princess, radiant, rectangle, round, square, trillion, and other.

After selecting information from various pull-down menus 188 through multi-query interface 186, the user inputs the selection criteria to system 10 with a submit button 200 and a results page 202 (shown in FIG. 8) is displayed. Additionally, the user may select a reset button 203 and start the search over, or the user may select a new category 104 with a second submit button 204. Results page 202 corresponds to the search criteria selected within multi-query interface 186 for the item being replaced. Results page 202 includes a thumbnail picture image column 206, a brief description column 208, a retail price column 210, and a replace/submit for replacement column 212. Each individual thumbnail picture image displayed in column 206 may be selected to display an enlarged picture. Column 212 enables the user to order an item for replacement displayed in column 206.

Figure 8:
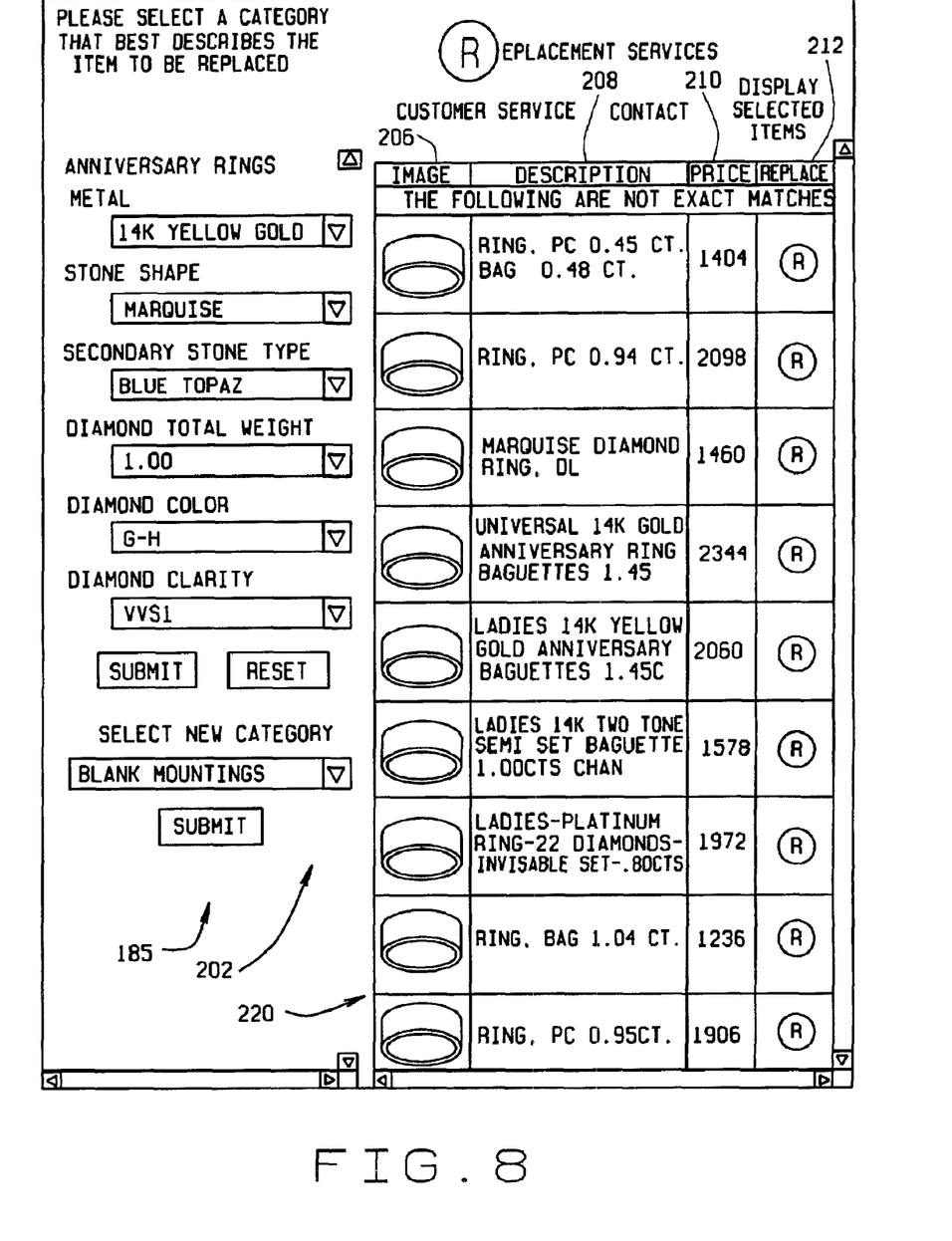
FIG. 8 is an exemplary search results page for the exemplary anniversary ring product information entered within the search page shown in FIG.

In one embodiment, the user selects anniversary rings 120 from jewelry categories 104 in listing 102. A hyperlink takes the user to anniversary rings product information search page 180 and through a plurality of search criteria categories displayed with multi-query interface 186, the user selects data from pull-down menus 188 specific to the item being replaced. More specifically, as shown in FIG. 8, the user selects "14K Yellow Gold" to satisfy the metal category, "Marquise" to complete the stone shape, "Blue Topaz" to satisfy the secondary stone type, "1.00" for the diamond total weight, "G–H" for the diamond color, and "WS1" for the diamond clarity.

After the user selects submit button 200, a search results page 202 is displayed. FIG. 8 is an exemplary search results page 220 for the exemplary anniversary ring product information entered. After the user has examined each thumbnail picture image 206 displayed, the user selects an item for replacement using column 212. The user's selection is forwarded 60 (shown in FIG. 2) to an authorizing agent for review and authorization.

System 10 facilitates an easy and efficient method for identifying and ordering items to replace insured items. System 10 is network based and is configured to permit users to access system 10 from remote locations through devices 14.

While the invention has been described in terms of various specific embodiments, those skilled in the art will recognize that the invention can be practiced with modification within the spirit and scope of the claims.

What is claimed is:

1. A method for replacing insured items of an insured user using a web-based system including a server and at least one device connected to the server via a network, said method comprising the steps of:

receiving at the server, from an insurer, specification information about the item to be replaced via the device;

comparing the received item specification information with potential replacement product information pre-stored within the server;

selecting at least one potential replacement product which matches the received item specification information;

downloading item feature information, product accessory information, and a price quote related to the selected potential replacement product;

storing the selected potential replacement options in a database for access by at least one of the insured user and the insurer;

approving, by the insurer, at least one of the potential replacement product options, whose information was downloaded;

displaying the downloaded information to the insured user via the device;

prompting the insured user to select at least one replacement item from the downloaded information.

2. A method in accordance with claim 1 further comprising the steps of:

submitting selection information to at least one of an authorizing agent, a manufacturer, and a distributor; and tracking shipping of the product.

3. A method in accordance with claim 1 wherein said step of receiving specification information about the item further comprises the step of receiving specific information input into a multi-query search engine by at least one of a user, a system administrator, a manufacturer, a distributor, and an authorizing agent.

4. A method in accordance with claim 1 wherein said insured items include jewelry, said step of receiving specification information about the item further comprises the step of receiving metal information for the jewelry to be replaced.

5. A method in accordance with claim 1 wherein said insured items include jewelry, said step of receiving specification information about the item further comprises the step of receiving gem stone shape information for the jewelry to be replaced.

6. A method in accordance with claim 1 wherein said insured items include jewelry, said step of receiving specification information about the item further comprises the step of receiving primary and secondary stone information for the jewelry to be replaced.

7. A method in accordance with claim 1 wherein said insured items include jewelry, said step of receiving specification information about the item further comprises the step of receiving gem total weight information for the jewelry to be replaced.

8. A method in accordance with claim 1 wherein said insured items include jewelry, said step of receiving specification information about the item further comprises the step of receiving, gem color information for the jewelry to be replaced.

9. A method in accordance with claim 1 wherein said insured items include jewelry, said step of receiving specification information about the item further comprises the step of receiving gem clarity information for the jewelry to be replaced.

10. A method in accordance with claim 1 wherein said step of receiving specification information about the item further comprises the step of receiving accessory information for the item to be replaced.

11. A method according to claim 1 wherein said step of receiving product specification information comprises the step of receiving general purpose jewelry information.

12. A method according to claim 1 wherein said step of receiving product specification information comprises the step of providing a retail price.

13. A method according to claim 1 wherein said step of comparing the received product specification information comprises the step of determining whether the item includes any accessories.

14. A method according to claim 1 wherein said step of downloading information related to the product comprises the step of downloading features for the product.

15. A method according to claim 1 further comprising the step of guiding the user to a compatible product.

16. A method in accordance with claim 15 wherein said step of guiding the user further comprises displaying photographs of compatible products.

17. A method in accordance with claim 16 further comprising the step of receiving a user selection representing a compatible product.

18. A method in accordance with claim 1 wherein said step of receiving specification information about the item further comprises the steps of:

receiving specification information about the item from an authorizing agent;

comparing the received item specification information from the authorizing agent with pre-stored information; and using the received item specification information to download information related to products which match the received item specification information.

19. A method in accordance with claim 1 wherein approving by the insurer comprises pre-approving by the insurer, at least one of the potential replacement products, whose information was downloaded.

20. A system for facilitating selection of an item by an insured user to replace an insured jewelry item of the insured user, said system comprising:

a device; and a server connected to said device and configured to receive specification information data from an insurer about the jewelry item to be replaced via said device, the information including at least one of a feature of the item, an accessory of the item, and a price quote, said server further configured to identify stored product information data that matches item specification information data entered into the server, download potential replacement product information, and store potential replacement product options to a database accessible to at least one of the insured user and the insurer for approval and to display the product information for the pre-selected and approved potential replacement products to the insured user to enable the insured user to select a replacement item from the downloaded product information.

21. A system in accordance with claim 20 wherein said server further configured to select at least one item from the stored item information data which matches the item identification data entered by at least one of a user, a system administrator, a manufacturer, a distributor, and an authorizing agent.

22. A system in accordance with claim 20 wherein the at least one item is available for purchase by the user.

23. A system in accordance with claim 20 wherein the at least one item for replacing an insured item subject to an insurance claim.

24. A system in accordance with claim 20 wherein said server further configured to submit stored item information data to at least one of an authorizing agent, a manufacturer, and a distributor.

25. A system in accordance with claim 20 wherein said server further configured to track shipping of the product.

26. A system in accordance with claim 20 wherein said server further configured to execute a multi-query search to identify stored product information data that matches the item information data entered by the user.

27. A system in accordance with claim 20 wherein said system further configured to receive metals information about the jewelry to be replaced.

28. A system in accordance with claim 20 wherein the item is jewelry, said system further configured to receive metals information about the jewelry.

29. A system in accordance with claim 28 wherein said system further configured to receive gem stone information about the jewelry.

30. A system in accordance with claim 28 wherein said system further configured to receive metals information about the jewelry.

31. A system in accordance with claim 28 wherein said system further configured to receive primary and secondary gem stone information about the jewelry.

32. A system in accordance with claim 28 wherein said system further configured to receive gem total weight information about the jewelry.

33. A system in accordance with claim 28 wherein said system further configured to receive gem color information about the jewelry.

34. A system in accordance with claim 28 wherein said system further configured to receive gem clarity information about the jewelry.

35. A system in accordance with claim 28 wherein said system further configured to receive general purpose jewelry information.

36. A system in accordance with claim 20 wherein said system further configured to guide the user to a product.

37. A system in accordance with claim 20 wherein said system further configured to display photographs of compatible products.

38. A system in accordance with claim 20 wherein the item specification information data is supplied to said server from at least one of an authorizing agent, a user, a manufacturer, a distributor, and a system administrator.

39. A system in accordance with claim 20 wherein said server is further configured to receive indication of a pre-approval by the insurer of the downloaded potential replacement product options.

* * * * *